(12) United States Patent
Licardie et al.

(10) Patent No.: US 9,825,724 B2
(45) Date of Patent: Nov. 21, 2017

(54) SYSTEMS AND METHODS FOR TRANSPORTING A CLOCK SIGNAL OVER A NETWORK

(71) Applicant: Aviat U.S., Inc., Santa Clara, CA (US)

(72) Inventors: Sergio Licardie, Cupertino, CA (US); Ivana Maric, Sunnyvale, CA (US)

(73) Assignee: Aviat U.S., Inc., Milpitas, CA (US)

( * ) Notice: Subject to any disclaimer, the term of this patent is extended or adjusted under 35 U.S.C. 154(b) by 44 days.

(21) Appl. No.: 14/150,698

(22) Filed: Jan. 8, 2014

(65) Prior Publication Data

US 2014/0192797 A1 Jul. 10, 2014

Related U.S. Application Data

(60) Provisional application No. 61/750,309, filed on Jan. 8, 2013.

(51) Int. Cl.
*H04J 3/06* (2006.01)

(52) U.S. Cl.
CPC .................. *H04J 3/0658* (2013.01)

(58) Field of Classification Search
USPC ........................................ 370/350
See application file for complete search history.

(56) References Cited

U.S. PATENT DOCUMENTS 7,440,474 B1 10/2008 Goldman et al.
8,325,704 B1 12/2012 Lemkin et al.
8,442,019 B2 * 5/2013 Trott .................. H04B 1/715
  370/342
8,681,772 B2 * 3/2014 Ehlers ................ H04L 12/4625
  370/328
8,873,588 B2 * 10/2014 Joergensen ........... H04J 3/0667
  370/503
9,515,756 B2 * 12/2016 Khoury ................ H04J 3/0667
(Continued)

FOREIGN PATENT DOCUMENTS

WO 2006029511 3/2006

OTHER PUBLICATIONS

IEEE Std 1588-2008, published by IEEE, 3 Park Ave, New York, NY 10016-5997, dated Jul. 24, 2008.*
(Continued)

*Primary Examiner* — Gregory Sefcheck
*Assistant Examiner* — Majid Esmaeilian
(74) *Attorney, Agent, or Firm* — Sheppard, Mullin, Richter & Hampton LLP

(57) ABSTRACT

According to some embodiments, a master device sends synchronization packets to one or more slave devices, and does so periodically based on a master clock signal having a master clock frequency. At each of the slave devices, an algorithm estimates the master clock frequency based on the timing of synchronization packet arrivals the slave device. The algorithm may estimate the master clock frequency using both the currently-observed timing of synchronization packet arrivals and the history of previous synchronization packet arrivals (e.g., previously-observed timing of synchronization packet arrivals). Based on the estimated master clock frequency, each of the one or more slave devices can update the frequency of their respective slave clock signal (e.g., using a frequency offset) to match that of the estimated master clock frequency.

24 Claims, 9 Drawing Sheets

(56) References Cited

U.S. PATENT DOCUMENTS

| | | | |
|---|---|---|---|
| 9,520,860 B2 * | 12/2016 | Whitehead | G06F 1/14 |
| 2004/0208268 A1 | 10/2004 | Yin Ying | |
| 2007/0032241 A1 * | 2/2007 | Busch | H04B 7/022 |
| | | | 455/450 |
| 2007/0189154 A1 | 8/2007 | Hourtane et al. | |
| 2010/0100759 A1 * | 4/2010 | Blixt | G06F 1/14 |
| | | | 713/502 |
| 2010/0118894 A1 | 5/2010 | Aweya et al. | |
| 2010/0158183 A1 | 6/2010 | Hadzic et al. | |
| 2010/0220748 A1 * | 9/2010 | Inomata | G04G 5/00 |
| | | | 370/503 |
| 2010/0309934 A1 | 12/2010 | Umayabashi et al. | |
| 2011/0080985 A1 | 4/2011 | Secker et al. | |
| 2011/0161701 A1 * | 6/2011 | Blixt | H03L 1/026 |
| | | | 713/320 |
| 2011/0200051 A1 * | 8/2011 | Rivaud | H04J 3/0641 |
| | | | 370/400 |
| 2011/0261917 A1 * | 10/2011 | Bedrosian | H04J 3/0667 |
| | | | 375/371 |
| 2012/0099432 A1 * | 4/2012 | Bercovich | H04J 3/0658 |
| | | | 370/235 |
| 2014/0068315 A1 * | 3/2014 | Aweya | G06F 1/04 |
| | | | 713/503 |

OTHER PUBLICATIONS

International Application No. PCT/US2014/010737, International Search Report and Written Opinion dated Jun. 5, 2014.

Aweya, James, "Digital Phase-Locked Loop for Frequency Distribution Over Packet Networks," 37th Annual Conference on IEEE Industrial Electronics Society (IECON 2011), pp. 2192-2197, Nov. 7, 2011.

Lau, R.C. et al., "Synchronous Techniques for Timing Recovery in BISDN," Conference Record, IEEE Global Telecommunications Conference, Communication for Global Users (GLOBECOM '92), pp. 814-820, Dec. 6, 1992.

Little, Stuart, "Is Microwave Backhaul up to the 4G Task?," IEEE Microwave Magazine, vol. 10, No. 5, pp. 67-74, Aug. 2009.

Machizawa, Akihiko et al., "Packet Arrival Interval (PAI)-Based Time Synchronization," Electronics and Communications in Japan (Part 1: Communications), vol. 90, No. 11, pp. 12-24, Nov. 2007.

European Patent Application No. 14737882.2., Search Report dated Jul. 14, 2016.

* cited by examiner

SYSTEMS AND METHODS FOR TRANSPORTING A CLOCK SIGNAL OVER A NETWORK

CROSS-REFERENCE TO RELATED APPLICATIONS

The present application claims the benefit of U.S. Provisional Patent Application Ser. No. 61/750,309, filed Jan. 8, 2013 and entitled "Method for Transporting G.8262 Compliant Clock Over a Multihop Microwave," which is incorporated by reference herein.

BACKGROUND

1. Field of the Invention(s)

The present invention(s) relate to synchronization, and more particularly, to systems and methods for network synchronization.

2. Description of Related Art

Synchronized time information is important for distributed systems, particularly those containing distributed components networked together using wired or wireless networks (e.g., a microwave network). Synchronous Ethernet (SyncE) is just one solution utilized in distributing clock synchronization information over a network. SyncE is an ITU-T standard for transporting a clock signal over an Ethernet network layer. ITU-T G.8261 defines the architecture of SyncE networks, and ITU-T G.8262 specifies Synchronous Ethernet clocks for SyncE (i.e., specifies G.8262-compliant clock signal). According to its specification, SyncE is designed to be compatible with Synchronous Digital Hierarchy (SDH) networks.

The Precision Time Protocol (PTP), as described in IEEE 1588, is another method for synchronizing clocks of distributed components over a network. Under PTP, clock distribution is facilitated through a master-slave architecture using one or more clocks. According to PTP, an ordinary clock is a network device that has a single network connection and that is either a source (mater node) or a destination (slave node) for clock synchronization reference over PTP. A boundary clock is a network device that has multiple network connections and that is used to bridge clock synchronization between different network segments using PTP. A transparent clock is a device that modifies PTP messages (e.g., modifies message timestamp) as they pass through the device. When a network consists of IEEE 1588 aware devices (i.e., ordinary clocks, boundary clocks, or transparent clocks), high precision clock synchronization can be obtained with very simple clock servo algorithms to determine rate adjustments and time corrections. With PTP, sophisticated processing is not necessary as only simple averaging or filtering of the protocol measurements is required.

Though use of PTP has very low demands on local clocks and networks, in order to implement PTP, the components on the network must be configured (i.e., include additional hardware and/or firmware) to take advantage of PTP. When a network consists of devices that are not IEEE 1588 aware, packet delay variation (PDV) is often present and can be significant. Additionally, clock synchronization using PTP requires feedback from a slave node to a master node and, at times, may require recovery at the slave node of both the frequency and the phase of the clock at a master node in order to synchronize a clock at the slave node.

SUMMARY OF EMBODIMENTS

Various embodiments described herein provide systems, methods, and apparatuses relating to synchronization and, more particularly, clock synchronization over a network, such as a microwave network, between a master digital device (hereafter, "master device") and one or more slave digital devices (hereafter, "slave devices"). Master and slave devices may be regarded as nodes of a network, such as a microwave network.

According to some embodiments, a system relating to a master device is provided, where the system comprises a clock module, a counter module, a packet generation module, and a communication module. The clock module may be configured to provide the system with a master clock signal having a master clock frequency, and may be further configured to synchronize the master clock signal based on a primary reference clock, such as SyncE reference clock. The clock module may comprise a stratum 3 oscillator. The counter module may be configured to maintain a counter value based on the master clock signal. The packet generation module may be configured to monitor the counter value and generate a synchronization packet when the counter value satisfies a condition. Depending on the embodiment, the condition may include the counter value reaching or exceeding a predefined value. The communication module may be configured to transmit the synchronization packet from a master device to a slave device. Additionally, the system may be included in (e.g., as part of) a split-mount microwave system configured to transmit the synchronization packet from the master device to the slave device. For some embodiments, the synchronization packet is transmitted from the master device to a plurality of slave devices, which may be achieved through multicast communication from the master device to the slave devices.

According to some embodiments, a system relating to a slave device is provided, where the system comprises a packet monitoring module, a clock module, a counter module, a clock frequency estimation module, and a frequency offset module. The packet monitoring module may be configured to monitor for and detect receipt of a synchronization packet from a master device. The clock module may be configured to provide a slave clock signal having a slave clock frequency. The counter module may be configured to maintain a counter value based on the slave clock signal. The clock frequency estimation module may be configured to receive from the counter module a current counter value and determine an estimated clock frequency of the master device based on the current counter value. The clock frequency estimation module may be further configured to determine the estimated clock frequency for the master device further based on a previously estimated clock frequency for the master device. The clock frequency estimation module may be further configured to determine the estimated clock frequency for the master device by using an algorithm that uses a Kalman filter with the current counter value and with the previously estimated clock frequency for the master device. The current counter value may be used as currently-observed packet arrival timing, and the previously estimated clock frequency may be used as the previously-observed synchronization packet arrival timing. The current counter value may be a counter value obtained from the counter module in response to the packet monitoring module detecting the receipt of the synchronization packet form the master device. The frequency offset calculation module may be configured to calculate a frequency offset based on the estimated clock frequency of the master device and the slave clock frequency. The system may further comprise a communication module configured to receive the synchronization packet from the master device. The system may be included in (e.g., as part of) a split-mount microwave system configured to receive the synchronization packet from the master device. Depending on the embodiment, the clock module may be further configured to update the slave clock frequency based on the frequency offset. For some embodiments, upon convergence of the algorithm (e.g., after multiple iterations of the algorithm), the estimated clock frequency for the master device will become so accurate that the frequency offset calculated based on the estimated clock frequency will cause the slave clock frequency to become a replica of the clock frequency of the master device. Additionally, the system may further comprise a buffer module configured to receive synchronization packets before the synchronization packets are detected by the packet monitoring module.

According to various embodiments, a system comprises a master device and at least one slave device, each of which includes some or all of the components or functionality described herein. Additionally, in some embodiments, a computer system, or a computer program product, comprises a computer readable medium having computer program code (i.e., executable instructions) executable by a processor to perform various steps and operation described herein.

BRIEF DESCRIPTION OF THE DRAWINGS

The drawings are provided for purposes of illustration only and merely depict typical or example embodiments. These drawings are provided to facilitate the reader's understanding and shall not be considered limiting of the breadth, scope, or applicability various embodiments.

Figure 1:
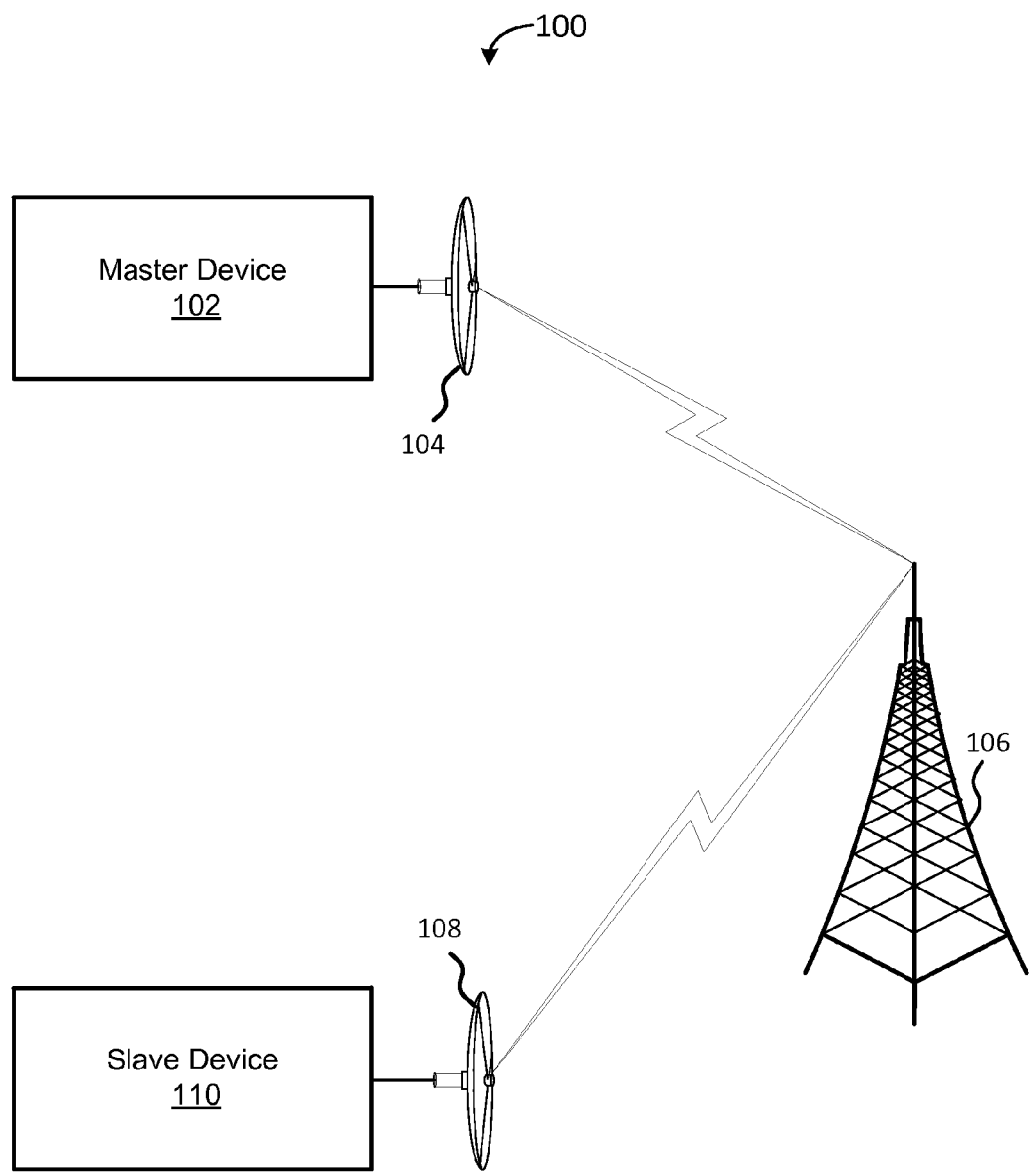
FIG. 1 depicts an example environment including a master device and a slave device communicating over a communication network in accordance with some embodiments.

The figures are not intended to be exhaustive or to limit the embodiments to the precise form disclosed. It should be understood that various embodiments may be practiced with modification and alteration.

DETAILED DESCRIPTION OF VARIOUS EMBODIMENTS

Various embodiments described herein provide systems, methods, and apparatuses relating to synchronization and, more particularly, clock synchronization over a network between a master digital device and one or more slave digital devices.

According to some embodiments, a master device sends synchronization packets to one or more slave devices, and does so periodically based on a master clock signal having a master clock frequency. At each of the slave devices, an algorithm estimates the master clock frequency based on the timing of synchronization packet arrivals at the slave device. The algorithm may estimate the master clock frequency using both the currently observed timing of synchronization packet arrivals and the history of previous synchronization packet arrivals (e.g., previously observed timing of synchronization packet arrivals). Based on the estimated master clock frequency, each of the one or more slave devices can update the frequency of their respective slave clock signal (e.g., using a frequency offset) to match that of the estimated master clock frequency.

For some embodiments, a Synchronous Ethernet (G.8262) compliant clock signal is transported over a microwave network from a master device to one or more slave devices. In particular, a master clock signal at the master device may be synchronized with (e.g., locked to) a primary reference clock (PRC), and may be distributed from the master device to multiple slave devices simultaneously, possibly using multicast communication.

In various embodiments, a master device maintains a local counter and transmits a synchronization packet to one or more slave devices each time a count value of the local counter reaches a predefined value. In some embodiments, the local counter is configured and the predefined value is set such that synchronization packets are sent to slave devices at a constant interval. The master device may utilize a digital phase locked loop (DPLL) synchronized with (e.g., locked to) the PRC to produce a master clock signal from which the local counter is driven. For some embodiments, the synchronization packets are transported from the master device to the slave devices by a microwave network, possibly using dedicated out of band channels of limited capacity (e.g., 64 Kbps to 2.048 Mbps is utilized).

For some embodiments, a given slave device recovers the master clock frequency of the master clock based on the timing at which synchronization packets are received by the slave device. Upon recovering the master clock frequency, the slave device can replicate the master clock frequency by controlling a frequency offset of a local free running DPLL at the slave device. This can be achieved by maintaining, at the salve device, a local counter driven by the frequency of the local free running DPLL. At the moment that the slave device receives a synchronization packet from the master device, the slave device can latch its local counter and interrupt a main processor for retrieval of a current counter value from the local counter. This current counter value may be used to run an algorithm that estimates the master clock frequency. Based on the estimated master clock frequency, the slave device can calculate a frequency offset adjustment needed to match a frequency locally synthesized at the slave device (e.g., a slave clock frequency generated through a slave DPLL separate from the local free running DPLL) to the estimated master clock frequency. The frequency-offset adjustment needed may depend on whether the current counter value is larger than expected or lower than expected. For instance, if the current counter value is larger than expected, the slave device may determine that the locally synthesized frequency is higher than expected and the frequency offset adjustment should be reduced, and if the current counter value is smaller than expected, the slave device may determine that the frequency offset adjustment should be increased. The algorithm may utilize the current counter value and historical estimates of the master clock frequency, as computed in previous iterations of the algorithm, to filter out instantaneous variations of the counter value. Based on the estimated master clock frequency, the frequency-offset adjustment can be implemented by adjusting the offset of a slave DPLL to a new frequency that matches the estimated master clock frequency.

For some embodiments, systems, methods, and apparatuses described herein deliver ITU-T G.8262 compliant clock over a network from a master device, which may be synchronized with a primary reference clock (PRC), to one or more slave devices over a network, which may be located several network hops (e.g., wireless hops) away from the master device. Various embodiments compensate for jitter, wander accumulation, or both, which may be caused by bit stuffing operations (stuffing operations) over a backplane or a radio link. For some embodiments, clock synchronization between a master device and one or more slave devices is achieved without requiring feedback from the slave devices to the master device, unlike synchronization via PTP in accordance with IEEE 1588. Some embodiments are agnostic to the transportation medium utilized between a master device and one or more slave devices. For instance, systems, methods, and apparatuses described herein may be agnostic to packets traveling over different transportation media, such as TDM backplanes or wireless channels. Particular embodiments provide improved synchronization performance over clock synchronization solutions provided by an E1 or T1 clock source. Some embodiments compensate for instabilities (e.g., short-term stability, such as short-term frequency changes) that can exist in the local reference clocks at slave devices and, in doing so, can allow for such slave devices to utilize lower-quality crystal oscillator (TCXO), such as a stratum 3 oscillator. The TCXO utilized may be lower in quality than TCXOs typically utilized by slave devices when achieving clock synchronization using IEEE 1588. For some embodiments, slave devices achieve clock synchronization with a master device by only recovering a master clock frequency and not a master clock phase. Additionally, some embodiments transport clock quality level information (QL) through synchronization packets transmitted from a master device to a slave device.

FIG. 1 depicts an example environment 100 including a master device 102 and a slave device 110 communicating over a communication network in accordance with some embodiments. As shown, the master device 102 is coupled to an antenna 104, the slave device 110 is coupled to an antenna 108, and the master device 102 and the slave device 110 are communication with each other using their antennae 104/108 over one or more wireless communication towers 106. Those skilled in the art will appreciate that the master device 102 and the slave device 110, individually or together, may communicate with any digital device or receiver. Although only the single wireless communication tower 106 is depicted in FIG. 1, the master device 102 and the slave device 110 may communicate over any number of network elements including any number of wireless communication towers, routers, servers, bridges, hubs, other digital devices, or the like.

As described herein, the master device 102 and the slave device 110 may be both digital devices. A digital device is any device with a processor and memory. In some embodiments, the master device 102 or the slave device 110 may comprise a transmitter, receiver transceiver, or the like. Examples of digital devices are further described with reference to FIG. 9. Depending on some embodiments, one or both of the master device 102 and the slave device 110 may include a split-mount transceiver, which may be configured for transmission or reception of microwave signals.

The master device 102 may comprise a master clock that generates a master clock signal having a master clock frequency. Likewise, the slave device 110 may comprise a slave clock. A master clock may be any clock, reference clock, or clock servo that may be used for synchronization of a slave clock of the slave device 110. The slave clock may be any clock or clock servo that may be synchronized with a master clock of the master device 102.

The wireless communication tower 106 (e.g., cell tower or other microwave radio device) may be any device(s) configured to receive or transmit wireless information. Although FIG. 1 depicts the master device 102 and the slave device 110 communicating over the single wireless communication tower 106, the wireless communication tower 106 should be understood to represent any network configured to allow communication between any number of digital devices and/or network elements (e.g., routers, switches, bridges, servers, and/or hubs). The wireless communication tower 106 may comprise the Internet, a LAN, WAN, or any other network. The wireless communication tower 106 may be or comprise a microwave, LTE, WiMax, 4G, 3G, or other wireless network. For example, the master device 102 and the slave device 110 may comprise radio frequency units implemented within a microwave network. Additionally, the wireless communication tower 106 should be understood to include wireless elements, wired elements, or a combination of wireless and wired elements.

Those skilled in the art will appreciate that systems, methods, and apparatuses described herein may be utilized over any wired or wireless network including Ethernet and WiFi networks.

The master device 102 may be configured to transport a Synchronous Ethernet (G.8262) compliant clock signal to the slave device 110 over the wireless communication tower 106. In particular, the master device 102 may be configured to facilitate synchronization of a slave clock signal at the slave device 110 with a master clock signal at the master device 102. The master clock signal at the master device 102 may be synchronized with (e.g., locked to) a primary reference clock (PRC).

According to various embodiments, the master device 102 sends synchronization packets to the slave device 110, and does so periodically based on the master clock signal. At the slave device 110, an algorithm may estimate the master clock frequency based on the timing of synchronization packet arrivals at the slave device 110. The algorithm may estimate the master clock frequency using both the currently observed timing of synchronization packet arrivals and the history of previous synchronization packet arrivals. Because the generation of synchronization packets at the master device 102 may be according to a counter driven by a master clock signal having a master clock frequency, the slave device 110 can utilize the arrival time of those synchronization packets at the slave device 110 to deduce the master clock frequency of the master clock signal.

Using the estimated master clock frequency, the slave device 110 can update its slave clock signal such that its frequency matches that of the estimated master clock frequency. In some embodiments, the algorithm at the slave device 110 converges upon a more accurate estimate of the master clock frequency after two or more iterations of the master device 102 sending a synchronization packet, the slave device 110 receiving the synchronization packet, the algorithm estimating the master clock frequency, and the slave device 110 updating its slave clock signal using the latest estimation of the master clock frequency. The synchronization between the slave clock signal and the master clock frequency may improve as the algorithm converges upon a more accurate estimation of the master clock frequency. For some embodiments, upon convergence of the algorithm, the estimated master clock frequency will become sufficiently accurate that the frequency offset calculated based on the estimated master clock frequency will cause the slave clock frequency of the slave device 110 to substantially replicate the master clock frequency of the master device 102.

Although only two devices are depicted in FIG. 1, those skilled in the art will appreciate that any number of digital devices may be synchronized to one or more digital devices. For example, the master device 102 may synchronize clocks of any number of slave devices. Further, the slave device 110 may have multiple clocks synchronized with any number of master digital devices.

Figure 2:
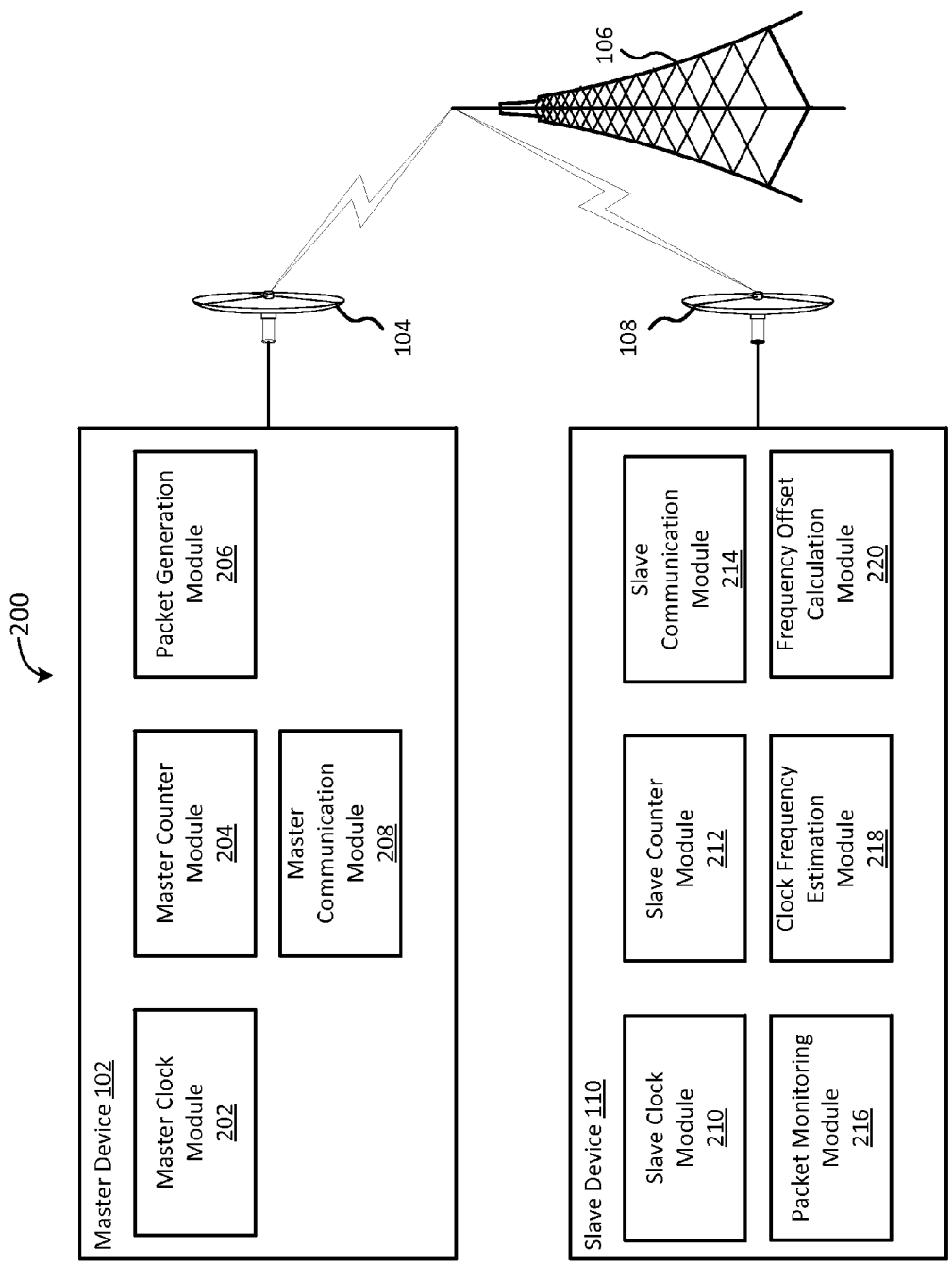
FIG. 2 depicts an example environment including a master device and a slave device communicating over a communication network in accordance with some embodiments.

FIG. 2 depicts an example environment 200 including the master device 102 and the slave device 110 communicating over a communication network in accordance with some embodiments. In FIG. 2, the master device 102 comprises a master clock module 202, a master counter module 204, a packet generation module 206, and a master communication module 208. The slave device 110 comprises a slave clock module 210, a slave counter module 212, a slave communication module 214, a packet monitoring module 216, a clock frequency estimation module 218, and a frequency offset calculation module 220.

As used herein, the term module might describe a given unit of functionality that can be performed in accordance with one or more embodiments. As used herein, a module might be implemented utilizing any form of hardware, software, or a combination thereof. For example, one or more processors, controllers, ASICs, PLAs, PALs, CPLDs, DPLLs, FPGAs, logical components, software routines or other mechanisms might be implemented to make up a module. In implementation, the various modules described herein might be implemented as discrete modules or the functions and features described can be shared in part or in total among one or more modules. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of some embodiments are implemented in whole or in part using software, in some embodiments, these software elements can be implemented to operate with a digital device capable of carrying out the functionality described with respect thereto.

With respect to the master device 102, the master clock module 202 may be configured to provide the master device 102 with a master clock signal having a master clock frequency. The master clock module 202 may include a local oscillator, such as a stratum 3 oscillator, to assist in the generation of the master clock signal. The master clock module 202 may be further configured to synchronize the master clock signal based on a primary reference clock (PRC), such as SyncE reference clock. For example, the master clock signal may be locked to the PRC delivered by a SyncE signal. To facilitate clock synchronization with the PRC, the master clock module 202 may utilize one or more digital phase-lock loops (DPLLs) driven by the clock signal of a local oscillator included in the master clock module 202. For instance, a particular DPLL of the master clock module 202 may lock onto the PRC and then provide a clock signal (e.g., the master clock signal) that replicates or substantially replicates the clock signal provided by the PRC.

The master counter module 204 may be configured to maintain a counter value driven by the master clock signal, which may be provided by the master clock module 202. Depending on the embodiment, the master counter module 204 may be configured to increment or decrement its counter value in relationship to the master clock signal and associated master clock frequency.

The packet generation module 206 may be configured to monitor the counter value maintained by the master counter module 204 and generate a synchronization packet when the counter value satisfies a particular condition, such as the counter value reaching, exceeding or falling below a predefined value, the counter value falling within a predefined range of values. Depending on the embodiment, the condition may include one or more mathematical operations with respect to the counter value, such as modulus operation. For example, the condition may be such that the condition is satisfied when performing a modulus operation on the counter value and a predefined value determines that the counter value is a multiple of the predefined value. Other conditions are also possible and may vary between different embodiments. The synchronization packet generated by the packet generation module 206 may be any form of network packet suitable for transmission over a network, including transmission over an Ethernet, WiFi, cellular, or microwave network.

The master communication module 208 may be configured to transmit the synchronization packet from the master device 102 to the slave device 110 through the antenna 104 and over the wireless communication tower 106. For some embodiments, the synchronization packet is transmitted from the master device 102 to a plurality of slave devices including the slave device 110, which may be achieved through multicast communication from the master device 102. As described herein, the master device 102 can provide clock synchronization to the slave device 110 without the need for feedback from the slave device 110 (e.g., via packet communication from the slave device 110 to the master device 102).

With respect to the slave device 110, the slave clock module 210 may be configured to provide the slave device 110 with a slave clock signal having a slave clock frequency. Additionally, the slave clock module 210 may include a local oscillator, such as a stratum 3 oscillator, to assist in the generation of the slave clock signal. During the process of synchronizing one or more slave clock signals (e.g., the slave clock signal) to a master clock signal of the master device 102 (e.g., its master clock signal), the slave clock module 210 may be configured to update or otherwise adjust various characteristics of the slave clock signals provided by the slave clock module, including clock signal frequency or phase. For instance, the slave clock module 210 may adjust the slave clock frequency of the slave clock signal, possibly over multiple iterations, in order to synchronize the slave clock signal to the master clock of the master device 102. A particular DPLL of the slave clock module 210 may be used to implement a frequency offset to a clock signal being generated by or based on a local oscillator included in the slave clock module 210. To facilitate clock synchronization with another clock signal (e.g., another master device 102), the slave clock module 210 may utilize another digital phase-lock loop (DPLL) driven by the clock signal of a local oscillator included in the slave clock module 210.

The slave counter module 212 may be configured to maintain a counter value driven by the slave clock signal, which may be provided by the slave clock module 210. Depending on the embodiment, the slave counter module 212 may be configured to increment or decrement its counter value in relationship to the slave clock signal and associated slave clock frequency.

The slave communication module 214 may be configured to receive synchronization packets from the master device 102 over the wireless communication tower 106 and through the antenna 108. For some embodiments, the slave device 110 is one of a plurality of slave devices receiving the synchronization packet from the master device 102 as part of a multicast communication from the master device 102. As described herein, the slave device 110 can achieve clock synchronization with the master device 102 without the need for feedback from the slave device 110 (e.g., via packet communication from the slave device 110 to the master device 102).

The packet monitoring module 216 may be configured to monitor for and detect receipt of synchronization packets from the master device 102. Depending on the embodiment, the packet monitoring module 216 may detect receipt of a synchronization packet at the time or shortly after the synchronization packet arrives at the slave device 110. For instance, the packet monitoring module 216 may detect receipt of a synchronization packet when the frame of the synchronization packet emerges from a FIFO packet buffer (e.g., of the slave communication module 214) configured to receive inbound packets for the slave device 110. Upon detecting receipt of the synchronization packet, the current counter value of the slave counter module 212 may be obtained for processing.

The clock frequency estimation module 218 may be configured to receive the current counter value of the slave counter module 212 and determine, based on the current counter value, an estimated clock frequency of a master clock signal of the master device 102. In some embodiments, the estimated clock frequency is for a master clock signal utilized in the generation of the synchronization packets at the master device 102. For example, the master device 102 may utilize a master clock signal having a master clock frequency to generate synchronization packets for transmission to the slave device 110 (e.g., master clock signal drives the master counter module 204, which in turn drives the packet generation module 206), and at the slave device 110 the clock frequency estimation module 218 may determine a clock frequency that is equal or substantially close to the master the master clock frequency of the master clock signal.

Depending on the embodiment, the clock frequency estimation module 218 may use an algorithm that, based on both the currently observed timing of synchronization packet arrivals and the history of previous synchronization packet arrivals, estimates the master clock frequency. In various embodiments, the observation of synchronization packet arrival times is facilitated at the slave device 110 by the counter value obtained by the slave device 110 (e.g., via the slave counter module 212). For example, the algorithm may use the current counter value combined with a history of one or more previous synchronization packet arrival counter values and/or previous master clock frequency estimations (e.g., previously estimated by the clock frequency estimation module 218). In some embodiments, the clock frequency estimation module 218 may use the current counter value (e.g., as obtained from the slave counter module 212 upon the packet monitoring module 216 detecting receipt of a synchronization packet) and historical estimates computed in previous iterations to filter out instantaneous variations of the counter value.

In various embodiments, the algorithm utilized for generating the estimated clock frequency is intended to model synchronization packet arrivals (e.g., arrival timing) at the slave device 110 as state equations in a linear dynamic system, with observed packet arrivals being viewed as noisy observations of "ideal" packet arrivals. Such noisy observations may be due to packet-delay variation (PDV) produced by stuffing operations performed at the master device 102 (e.g., in the backplane or the radio links) or by short-term instability of the local oscillator of the master device 102. Given the state-space and measurement equations/descriptions, a specific Kalman filter may be derived for the system. Different descriptions of the system will lead to different Kalman filter variants. By deploying first-order approximations in the derivation, the estimate update equations can be simplified so that no matrix calculation (otherwise required by a Kalman filter) is required, thereby simplifying estimate calculations in, e.g., every step.

The frequency offset calculation module 220 may be configured to calculate a frequency offset based on the estimated master clock frequency provided by the clock frequency estimation module 218 and the current clock frequency of a slave clock signal provided by the slave clock module 210. The frequency offset calculation module 220 may, for example, compare the estimated clock frequency provided by the clock frequency estimation module 218 to the current slave clock frequency of the slave clock signal and calculate the frequency offset that would need to be applied the slave clock signal for the slave clock frequency to match the estimated master clock frequency.

As described herein, the frequency offset may be applied to a slave clock signal of the slave device 110 by way of the slave clock module 210, which may include one or more DPLLs that enable adjustment to the slave clock signal. As also described herein, the algorithm at the slave device 110 may converge upon a more accurate estimate of a master clock frequency of a master clock signal of the master device 102 after two or more iterations of the master device 102 sending a synchronization packet, the slave device 110 receiving the synchronization packet, the algorithm estimating the master clock frequency of the master clock signal of the master device 102, and the slave device 110 updating its slave clock signal using the latest estimation of the master clock frequency. The synchronization between the slave clock signal and the master clock signal may improve as the algorithm converges upon a more accurate estimation of the master clock frequency.

For some embodiments, one or more of the master clock module 202, the master counter module 204, the packet generation module 206, and the master communication module 208 are implemented as part of an indoor unit (IDU) and/or outdoor unit (ODU) of a split-mount radio system for the master device 102. Likewise, for some embodiments, one or more of the slave clock module 210, the slave counter module 212, the slave communication module 214, the packet monitoring module 216, the clock frequency estimation module 218, and the frequency offset calculation module 220 are implemented as part of an IDU and/or ODU of a split-mount radio system for the slave device 110. An example of a split-mount radio system is described and depicted herein with respect to FIG. 8.

Figure 3:
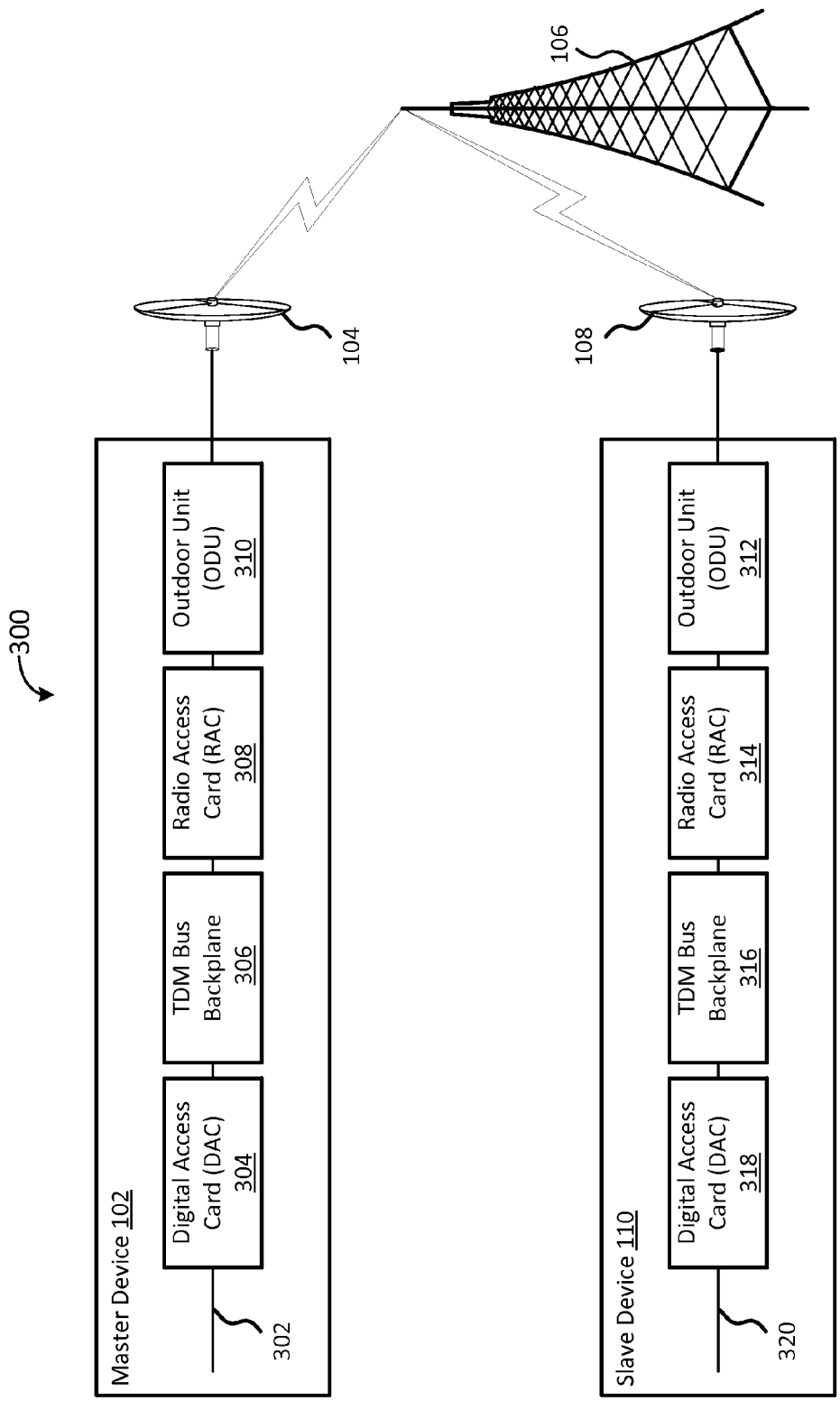
FIG. 3 depicts an example environment including a master device and a slave device communicating over a communication network in accordance with some embodiments.

FIG. 3 depicts an example environment 300 including the master device 102 and the slave device 110 communicating over a communication network in accordance with some embodiments. In FIG. 3, the master device 102 comprises a digital access card (DAC) 304 having a data line 302, a time-division multiplexing (TDM) bus backplane 306 coupled to the DAC 304, a radio access card (RAC) 308 coupled to the TDM bus backplane 306, and an outdoor unit (ODU) 310 coupled to the RAC 308. Likewise, the slave device 110 comprises a digital access card (DAC) 318 having a data line 320, a time-division multiplexing (TDM) bus backplane 316 coupled to the DAC 318, a radio access card (RAC) 314 coupled to the TDM bus backplane 316, and an outdoor unit (ODU) 312 coupled to the RAC 314. According to some embodiments, the configuration of the master device 102 and the slave device 110 depicted in FIG. 3 enables bi-directional communication of data traffic between the data line 302 and the data line 320 over one or more radio links. In FIG. 3, communication between the master device 102 and the slave device 110 may be facilitated through radio links between the wireless communication tower 106 and each of the master device 102 and the slave device 110. Those skilled in the art will appreciate that for some embodiments the components, functionality, or configuration of either the master device 102 or the slave device 110 may differ from what is described or depicted with respect to FIG. 3.

In some embodiments, each of the TDM bus backplanes 306 and 316 provides a platform that interfaces one or more network interfaces with one or more radio paths. For example, each of the TDM bus backplanes 306 and 316 may be configured to support and couple to one or more cards (e.g., DACs, RACs, and the like) that facilitate the interfacing of network interfaces with the radio paths. Each of the TDM bus backplanes 306 and 316 may facilitate communication between their respective cards and, in doing so, may enable a network interface (e.g., of a DAC) to communicate with a radio interface (e.g., of a RAC). The types of cards coupled to each of the TDM bus backplanes 306 and 316 may vary between different embodiments, and may include RACs, DACs, controller cards, and auxiliary cards that provide various network/radio communication functionality. For some embodiments, each of the TDM bus backplanes 306 and 316 combined with their respective cards implements a separate indoor unit (IDU), intelligent node unit (INU), or extended INU (INUe), which may be coupled to an ODU to facilitate wireless communication of network traffic.

According to some embodiments, each of the DACs 304 and 318 provides full termination of network payload transported between the end points of data lines 302 and 320. As such, each of the DACs 304 and 318 may provide one or more data interfaces for network traffic access. For example, the DACs 304 and 318 may provide interfaces and functionality for plesiochronous data hierarchy (PDH), synchronous data hierarchy (SDH), Ethernet, E1, T1, and the like.

According to various embodiments, each of the RACs 308 and 314 provides an interface to a radio transmitter/receiver. For instance, in FIG. 3, the RAC 308 may provide such an interface to the ODU 310, and the RAC 314 may provide such an interface from the ODU 312. Each of the RACs 308 and 314 may provide conversion between network traffic data of their respective DACs 304/318 and radio signals of their respective ODUs 310/312. The RAC 308 may, for example, convert network traffic received by the DAC 318 (e.g., through data line 302) to a radio signal suitable for transmission through ODU 310 as a radio link.

In another example, the RAC 314 may convert a radio signal received through the ODU 312 to network traffic accessible through the DAC 318 (e.g., through data line 320). To provide an interface to a radio transmitter/receiver, each of the RACs 308 and 314 may include components for modulation/demodulation (e.g., modem), data error correction (e.g., forward error correction [FEC]), adaptive equalization, intermediate frequency (IF) conversion, IF loopback, automatic protection switching (e.g., for hot standby, diversity, or ring configurations), and the like.

In some embodiments, each of the ODU 310 and 312 is disposed outdoors and coupled to their respective antenna 104/108. For some embodiments, each of the ODU 310 and 312 are mounted with their respective antenna. Additionally, for some embodiments, each of the ODU 310 and 312 include a radio frequency (RF) transmitter capable of transmitting RF signals through an antenna, and a RF receiver capable of processing RF signals received through an antenna. Each of the ODU 310 and 312 may be configured convert an RF signal, received over a radio link, to an intermediate frequency (IF) signal and provide the resulting IF signal to an RAC for conversion to network traffic. Each of the ODU 310 and 312 may also be configured to convert an IF signal, provided by an RAC, to an RF signal suitable for transmission over a radio link.

During a synchronization process, the DAC 304 of the master device 102 may generate one or more synchronization packets based on a master clock signal and forward the synchronization packets to the RAC 308 through the TDM bus backplane 306. At the RAC 308, the synchronization packets may be processed by a modem of the RAC 308 and forwarded to the ODU 310 (e.g., as an IF signal). Subsequently, the ODU 310 may transmit the synchronization packets to the wireless communication tower 106 over a radio link from the antenna 104 to the wireless communication tower 106. The wireless communication tower 106, in turn, may relay the synchronization packets to the slave device 110 over a radio link from the wireless communication tower 106 to the antenna 108.

The ODU 312 of the slave device 110 may receive the synchronization packets through the antenna 108, and may provide the synchronization packets to the RAC 314 (e.g., as an IF signal). The modem of RAC 314 may process the synchronization packets (e.g., IF signal) as received from the ODU 312, and may provide the synchronization packets to the DAC 318 of the slave device 110 via the TDM bus backplane 316. Thereafter, the DAC 318 of slave device 110 may use the synchronization packets to synchronize a slave clock signal at the slave device 110 according to the master clock signal of the master device 102.

Figure 4:
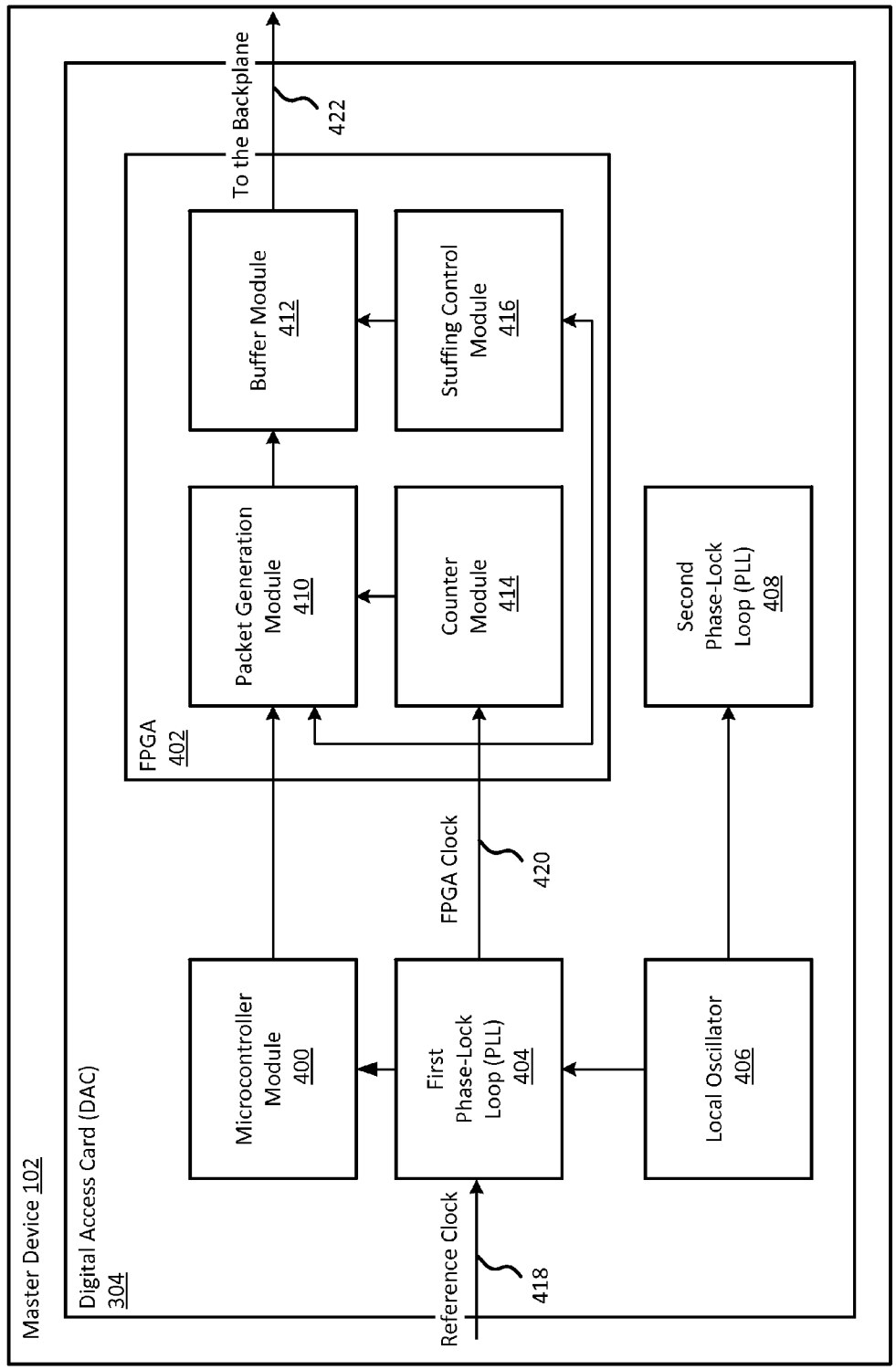
FIG. 4 is a block diagram of an example digital access card (DAC) in a master device in accordance with some embodiments.

FIG. 4 is a block diagram of the digital access card (DAC) 304 in the master device 102 in accordance with some embodiments. In FIG. 4, the DAC 304 comprises a microcontroller module 400, a field-programmable gate array (FPGA) 402, a first phase-lock loop (PLL) 404, a local oscillator 406, and a second PLL 408. Additionally, in FIG. 4, the FPGA 402 comprises a packet generation module 410, a buffer module 412, a counter module 414, and a stuffing control module 416. For some embodiments, the DAC 304 and its various components implement some or all of the operations of the master device 102 as described with respect to FIG. 2.

As shown in FIG. 4, the local oscillator 406 may provide a clock signal, which can drive the first PLL 404 and the second PLL 408. For some embodiments, the local oscillator 406 includes a lower-quality oscillator, such as a stratum 3 oscillator. The quality of the oscillator (e.g., short-term stability, precision, etc.) used as the local oscillator 406 may vary between different embodiments. The first PLL 404, the second PLL 408, or both may be implemented using a digital phase-lock loop (DPLL). For some embodiments, the output signal from the first PLL 404 is utilized as the master clock signal for the DAC 304. The first PLL 404 may use one of its synchronization inputs as a reference clock 418 and may lock onto the reference. In one example, the first PLL 404 receives a primary reference clock (PRC) (e.g., via a Synchronous Ethernet [SyncE], E1, or T1 signal) as the reference clock 418 and synchronizes itself to the PRC, thereby resulting in an output signal from the first PLL 404 that is synchronized with the PRC. Depending on the embodiment, the PRC may be received from a primary master clock such as an atomic clock or a geosynchronous positioning system (GPS) disciplined oscillator.

Depending on the embodiment, the output of the first PLL 404 may be used as a clock reference by various components of the DAC 304, including the microcontroller module 400 and the FPGA 402. For example, the output of the first PLL 404 may be used by the FPGA 402 as a FPGA clock 420. As the FPGA clock 420, the output of the first PLL 404 may be utilized in the operation of various components of the FPGA 402, including, for instance, the packet generation module 410, the counter module 414, and the stuffing control module 416. The counter module 414 may, for example, maintain a counter value in relationship to the FPGA clock 420 as provided by the output of the first PLL 404 (e.g., incrementing or decrementing the counter value upon each period of the FPGA clock 420). The counter module 414 may be implemented using one or more counters. Likewise, the operations of the packet generation module 410 and the stuffing control module 416 may be drive by the FPGA clock 420 as provided by the output of the first PLL 404.

According to some embodiments, the FPGA 402 generates synchronization packets that the master device 102 transmits to one or more slave devices (e.g., the slave device 110) during a synchronization process. Depending on the embodiment, the microcontroller module 400 may control the operation of various components of the FPGA 402, including the packet generation module 410. For example, the microcontroller module 400 may provide the packet generation module 410 with a predefined value that the packet generation module 410 may use in determining the interval at which synchronization packets are generated by the packet generation module 410 for transmission to a slave device (e.g., the slave device 110). The microcontroller module 400 may further control the packet generation module 410 by enabling or disable packet generation by the packet generation module 410 (e.g., when enabling or disabling the clock synchronization process), determining attributes of synchronization packets generated by the packet generation module 410 (e.g., size, content, type, destination, etc.), or specifying the condition under which the packet generation module 410 generate synchronization packets. Aspects of how the microcontroller module 400 controls the packet generation module 410 may be modifiable by a user (e.g., an administrator or radio technician) and may be pre-set at the time of manufacture of the DAC 304.

For some embodiments, the packet generation module 410 is configured to monitor a current counter value provided by the counter module 414 and generate a synchronization packet each time the current counter value satisfies a specific condition, such as the current counter value being equal to a predefined value. Subsequent to generating a synchronization packet, the packet generation module 410 may forward the synchronization packet for transmission, and may do so by placing the synchronization packet into the buffer module 412. For some embodiments, the buffer module 412 is configured to buffer packets intended to be forwarded out of the DAC 304 for transmission. To facilitate the packet buffering, the buffer module 412 may include one or more buffers, including one or more first-in first-out (FIFO) buffers. From the buffer module 412, packets may be forwarded for transmission via an output 422. The output 422 may be coupled to a backplane (e.g., the TDM bus backplane 306) configured to communicate a forwarded packet to a radio access card (RAC) (e.g., the RAC 308) or the like for wireless transmission.

For some embodiments, the (bit) stuffing control module 416 controls stuffing of non-informational bits into various packets passing through the buffer module 412. The stuffing control module 416 may, for example, disable or enable bit stuffing operations, determine which packets are bit stuffed, how many bits are stuffed into packets, and the like. By controlling bit stuffing operations, the stuffing control module 416 may facilitate plesiochronous digital hierarchy (PDH) or synchronous digital hierarchy (SDH) packet communications through the DAC 304.

Figure 5:
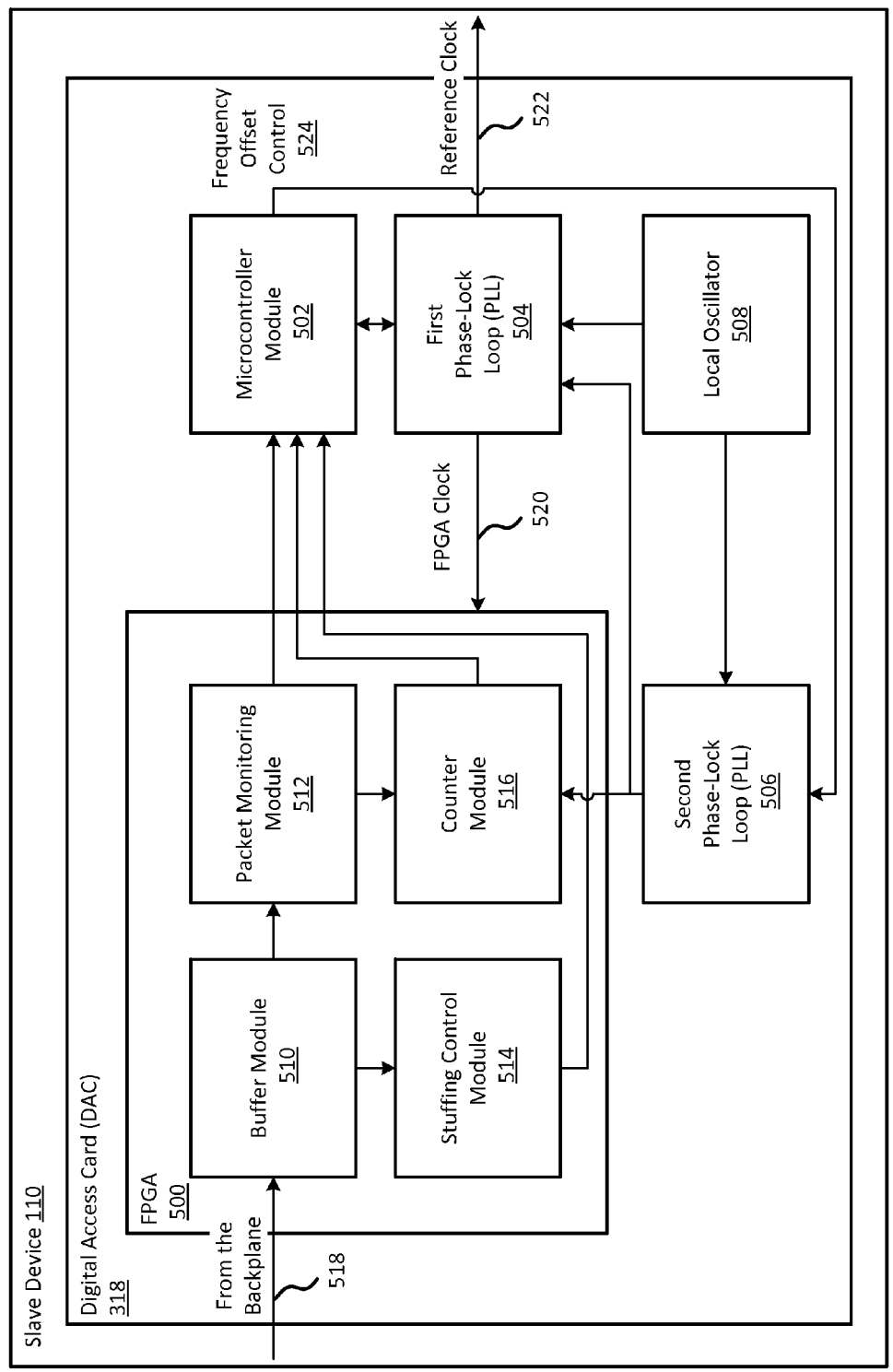
FIG. 5 is a block diagram of an example digital access card (DAC) in a slave device in accordance with some embodiments.

FIG. 5 is a block diagram of the digital access card (DAC) 318 in the slave device 110 in accordance with some embodiments. In FIG. 5, the DAC 318 comprises a field-programmable gate array (FPGA) 500, microcontroller module 502, a first phase-lock loop (PLL) 504, a second PLL 506, and a local oscillator 508. Additionally, in FIG. 5, the FPGA 500 comprises a buffer module 510, a packet monitoring module 512, a stuffing control module 514, and a counter module 516. For some embodiments, the DAC 318 and its various components implement some or all of the operations of the slave device 110 as described with respect to FIG. 2.

Those skilled in the art will appreciate that the DAC 304 of the master device 102 may comprise similar components similar to that of a DAC of a slave device (e.g., the DAC 318). For some embodiments, the DAC 304 of the master device 102 includes functionality that permits the master device 102 to operate as a slave device (e.g., with respect to another master device) with or without need for reconfiguration.

As shown in FIG. 5, the local oscillator 508 may provide a local clock signal, which can drive the first PLL 504 and the second PLL 506. For some embodiments, the local oscillator 508 includes a lower-quality oscillator, such as a stratum 3 oscillator. The quality of the oscillator (e.g., short-term stability, precision, etc.) used as the local oscillator 508 may vary between different embodiments. The first PLL 504, the second PLL 506, or both may be implemented using a digital phase-lock loop (DPLL). For some embodiments, the output signal from the second PLL 506 is utilized as the master clock signal for the DAC 304. The first PLL 504 may use the output signal from the second PLL 506 as one of its synchronization inputs and may lock onto the output signal. The second PLL 506 may also be utilized to drive the counter module 516. Once it is locked to the output signal of the second PLL 506, the first PLL 504 may output a reference clock signal 522 that is synchronized with the output signal. In some embodiments, the reference clock signal 522 may be provided as a Synchronous Ethernet (SyncE), E1, or T1 signal. One or more outputs of the first PLL 504 may also be used as a reference for the microcontroller module 502 and/or a FPGA clock 520 for the FPGA 500. For some embodiments, the output signal of the first PLL 504 is used to drive all synchronization outputs in the DAC 318.

For some embodiments, the counter module 516 is configured to maintain a counter value in relationship to the output signal of the second PLL 506 (e.g., incrementing or decrementing the counter value upon each period of the output signal). The counter module 516 may be implemented using one or more counters, and may be configured to latch at least one of those counters (e.g., for counter value retrieval) when instructed to do so. By latching the counter, the counter module 516 may retrieve the counter value at the time of the latch and store it for future retrieval.

According to some embodiments, the buffer module 510 receives a synchronization packet from a master device through data line 518, which may be coupled to a RAC (e.g., the RAC 314) via a backplane (e.g., the TDM bus backplane 316). The buffer module 510 may facilitate packet buffering and may include one or more buffer, including one or more first-in first-out (FIFO) buffers. From the buffer module 510, the synchronization packet is forwarded to the packet monitoring module 512.

For some embodiments, the packet monitoring module 512 is configured to monitor for receipt of synchronization packets and trigger further action upon detection of the receipt. The packet monitoring module 512 may detect receipt of a given synchronization packet when the packet monitoring module 512 detects the start of the frame of the synchronization packet leaving the buffer module 510. When the packet monitoring module 512 detects receipt of a synchronization packet, the packet monitoring module 512 may instruct the counter module 516 to latch, thereby causing the counter module 516 to retrieve the counter value at the time of the latch and store it for future retrieval by the packet monitoring module 512. When the packet monitoring module 512 detects receipt of a synchronization packet, the packet monitoring module 512 may further signal the microcontroller module 502 to retrieve the current counter value from the counter module 516. The packet monitoring module 512 may do so by having the FPGA 500 generate an interrupt to the microcontroller module 502, which can cause the microcontroller module 502 to retrieve the counter value.

In some embodiments, the microcontroller module 502 uses the counter value retrieved from the counter module 516 as an input to an algorithm that estimates the master clock frequency for a master clock signal of a master device generating the synchronization packets. Then, based on the estimated clock frequency and the current frequency of the master clock signal as provided by the first PLL 504, the microcontroller module 502 may calculate a frequency offset that can be applied to the slave clock signal. In some embodiments, the microcontroller module 502 applies the calculated frequency offset to the slave clock signal through a frequency offset control 524, which may control the frequency offset applied to the output signal of the second PLL 506. In this way, the estimated clock frequency determined at the microcontroller module 502 may be used to drive the second PLL 506, and a new frequency offset can be calculated by the microcontroller module 502 and applied to the second PLL 506 at each synchronization packet arrival and iteration of the algorithm of the microcontroller module 502. As described herein, after convergence of the algorithm of the microcontroller module 502, the estimated clock frequency for the master device will become sufficiently accurate that the frequency offset calculated by the microcontroller module 502 will cause the frequency of the output signal of the second PLL 506 (e.g., the slave clock frequency) to replicate or almost replicate the master clock frequency of the master device.

For some embodiments, the (bit) stuffing control module 514 facilitates detection and decoding of packets passing through the buffer module 510 that include stuffing of non-informational bits. The stuffing control module 514 may, for example, detect bit stuffing in a packet and inform the microcontroller module 502 of its presence. Subsequently, the microcontroller module 502 may receive a packet including bit stuffing and process (e.g., decode) the packet accordingly. As described herein, such functionality may facilitate plesiochronous digital hierarchy (PDH) or synchronous digital hierarchy (SDH) packet communications through the DAC 318.

Those skilled in the art will appreciate that the DAC 318 of the slave device 110 may comprise components similar to that of a DAC of a master device (e.g., the DAC 304). For some embodiments, the DAC 318 of the slave device 110 includes functionality that permits the slave device 110 to operate as a master device (e.g., for another slave device) with or without need for reconfiguration.

Figure 6:
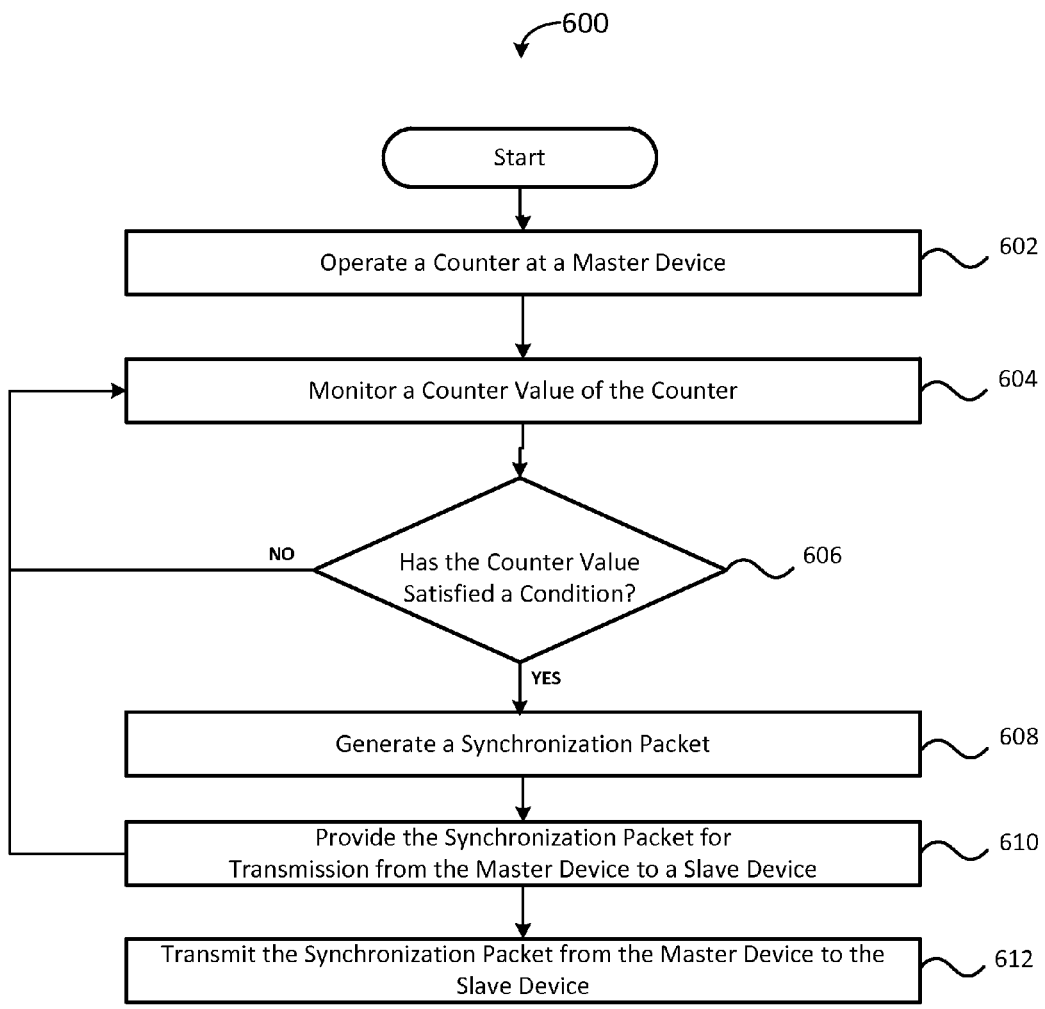
FIG. 6 is a flow diagram of an example method for clock synchronization in accordance with some embodiments.

FIG. 6 is a flow diagram of an example method 600 for clock synchronization in accordance with some embodiments. According to some embodiments, the method 600 is performed by a master device (e.g., the master device 102) when providing clock synchronization to a slave device (e.g., the slave device 110) over a communication network. For some embodiments, the method 600 begins at step 602 with the operation of the counter module 414 at the master device 102. At step 604, the packet generation module 410 at the master device 102 monitors a counter value being maintained by the counter module 414. As described herein, the counter module 414 may be driven by the first PLL 404, which may be configured to provide the DAC 304 with a master clock signal having a master clock frequency. The first PLL 404 may be synchronized with respect to a primary reference clock (PRC) received by the master device 102, thereby synchronizing the master clock signal with the PRC.

At step 606, if the packet generation module 410 determines that the current counter value satisfies a condition for generating a synchronization packet (e.g., the current counter value reaches a predefined value), the method 600 continues to step 608, where the packet generation module 410 generates the synchronization packet. If, however, at step 606 the packet generation module 410 determines that the current counter value does not satisfy the condition for generating a synchronization packet, the method 600 will proceed to step 604, where the packet generation module 410 continues to monitor the counter value of the counter module 414.

At step 610, the packet generation module 410 provides the synchronization packet, generated at step 608, for transmission from the master device 102 to the slave device 110. In particular, the packet generation module 410 may provide the synchronization packet to the TDM bus backplane 306 for transmission from the master device 102 to the slave device 110. Through the TDM bus backplane 306, the RAC 308 may receive the synchronization packet from the DAC 304. At step 612, the RAC 308 transmits the synchronization packet through the ODU 310 and the antenna 104. Subsequent to step 610, the method 600 may return to step 604 where the packet generation module 410 at the master device 102 continues monitoring the counter value being maintained by the counter module 414. When the method 600 returns to step 604 after step 610, it may do so in parallel with continuing to step 612.

Though the steps of the method 600 may be depicted and described in a certain order, those skilled in the art will appreciate that the order in which the steps are performed may vary between different embodiments. Additionally, those skilled in the art will appreciate that the components described above with respect to the method 600 are merely examples of components that may be used with the method 600, and that other components may also be utilized in some embodiments.

Figure 7:
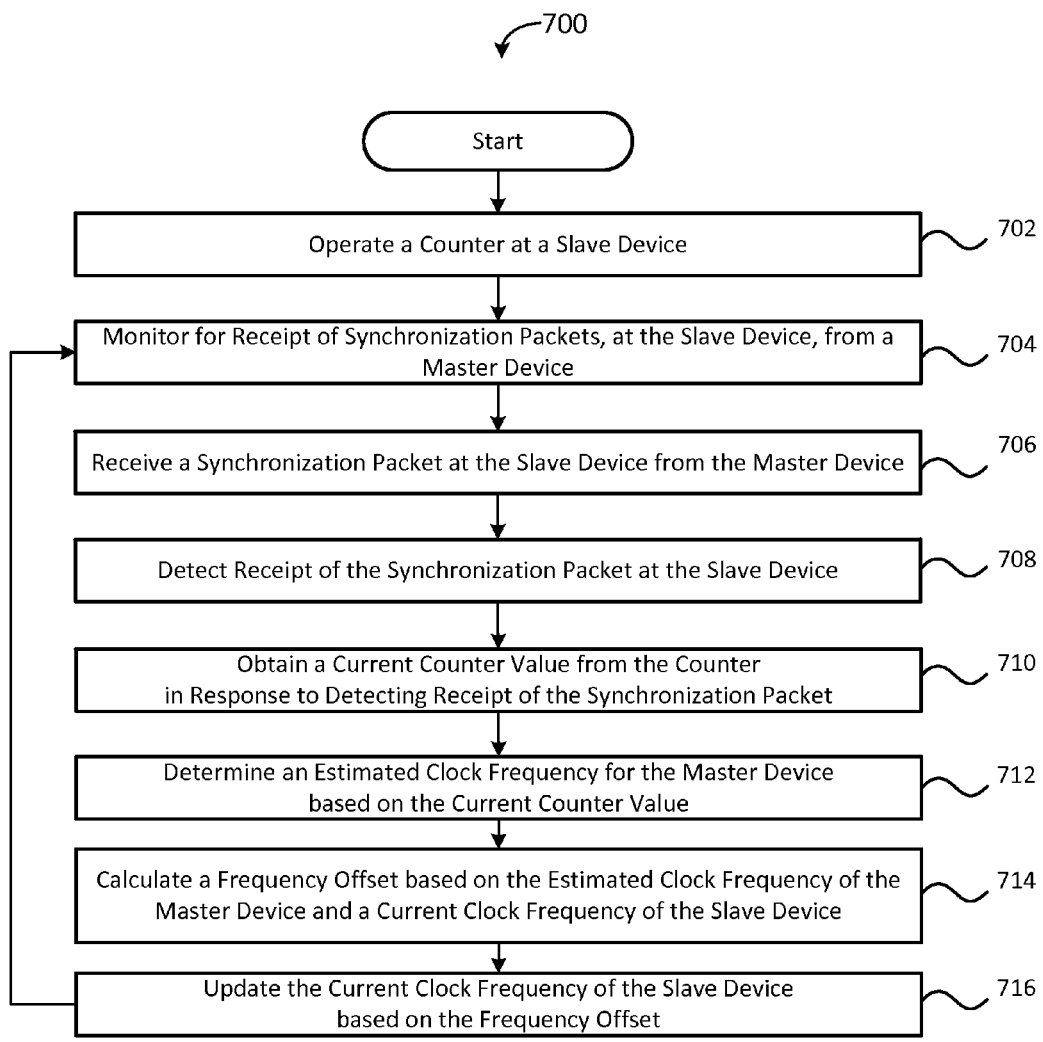
FIG. 7 is a flow diagram of an example method for clock synchronization in accordance with some embodiments.

FIG. 7 is a flow diagram of an example method 700 for clock synchronization in accordance with some embodiments. According to some embodiments, the method 700 is performed by a slave device (e.g., the slave device 110) to achieve clock synchronization with a master device (e.g., the master device 102) over a communication network. For some embodiments, the method 700 begins at step 702 with the operation of the counter module 516 at the slave device 110. At step 704, the packet monitoring module 512 monitors for receipt of synchronization packets at the slave device 110 from the master device 102.

At step 706, a synchronization packet from the master device 102 is received by the antenna 108 of the slave device 110 over a radio link. The antenna 108 may provide the synchronization packet to the ODU 312, which in turn may provide the synchronization packet to the RAC 314. Through the TDM bus backplane 316, the DAC 318 of the slave device 110 may receive the synchronization packet from the RAC 314. In particular, the buffer module 510 of the DAC 318 may receive the synchronization packet and provide the synchronization packet to the packet monitoring module 512.

At step 708, the packet monitoring module 512 detects receipt of the synchronization packet. The packet monitoring module 512 may detect receipt of the synchronization packet when the frame of the synchronization packet emerges from the buffer module 510. At step 710, a current counter value from the counter module 516 is obtained by the microcontroller module 502 of the slave device 110. The current counter value may be obtained at the time the packet monitoring module 512 detects receipt of the synchronization packet. Additionally, the current counter value may be obtained by the packet monitoring module 512 instructing or otherwise causing the counter module 516 to latch (e.g., store the counter value at the time of the latch for future retrieval), and signaling the microcontroller module 502 to retrieve the current counter value from the counter module 516.

At step 712, the microcontroller module 502 determines an estimated clock frequency, for the master clock signal of the master device 102, based on the current counter value obtained from the counter module 516. As described herein, the microcontroller module 502 may utilize one or more algorithms described herein to generate the estimated clock frequency.

At step 714, the microcontroller module 502 calculates a frequency offset based on the estimated clock frequency determined at step 712 and the current clock frequency provided by the first PLL 504 of the slave device 110. The frequency offset may be the difference needed to adjust the current clock frequency of the first PLL 504 to match the estimated clock frequency determined at step 712. As described herein, the first PLL 504 may be driven by the local oscillator 508 and synchronized to a reference provided by the second PLL 506 of the slave device 110. The first PLL 504 and second PLL 506 may provide a slave clock signal that has a slave clock frequency and that is utilized by various components of the DAC 318 (e.g., the FPGA 500). At step 716, the current clock frequency of the first PLL 504 is updated by adjusting the current clock frequency of the second PLL 506 using the frequency offset calculated at step 714. Subsequent to step 716, the method 700 may return to step 704, where the packet monitoring module 512 continues to monitor for receipt of synchronization packets, at the slave device 110, from the master device 102.

Though the steps of the method 700 may be depicted and described in a certain order, those skilled in the art will appreciate that the order in which the steps are performed may vary between different embodiments. Additionally, those skilled in the art will appreciate that the components described above with respect to the method 700 are merely examples of components that may be used with the method 700, and that other components may also be utilized in some embodiments.

Figure 8:
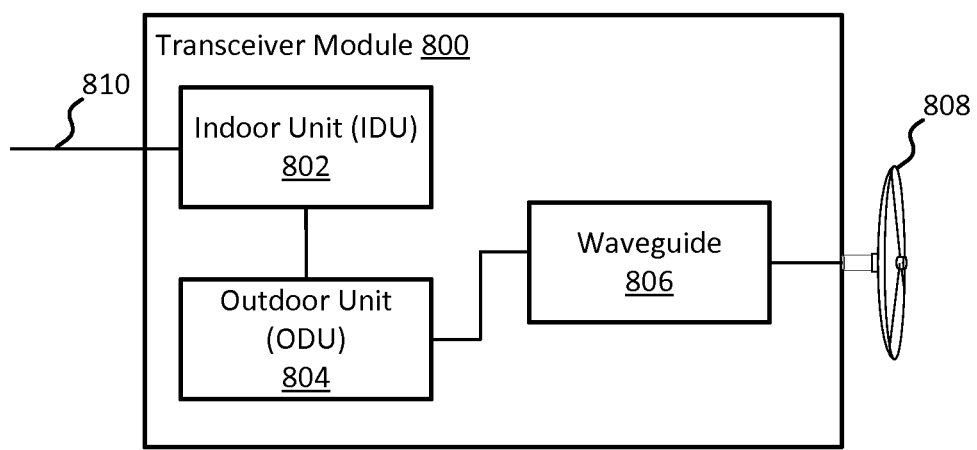
FIG. 8 is a block diagram of an example transceiver module utilized in clock synchronization in accordance with some embodiments.

FIG. 8 is a block diagram of an example transceiver module 800 utilized in clock synchronization in accordance with some embodiments. As shown, the transceiver module 800 includes an indoor unit (IDU) 802 coupled to an outdoor unit (ODU) 804, and a waveguide 806 coupled to the ODU 804. As also shown, the transceiver module 800 is coupled to an antenna 808, whereby the antenna 808 is coupled to the ODU 804 by way of the waveguide 806. Depending on the embodiment, the IDU 802, the ODU 804, or both may be configured to implement various clock synchronization operations described herein. Additionally, various embodiments described herein may include a transceiver module that varies in composition or arrangement in comparison to the transceiver module 800 shown in FIG. 8.

In accordance with some embodiments, one or more of the IDU 802, the ODU 804, the waveguide 806, and the antenna 808 are configured to implement a split-mount radio frequency unit, which may be further configured to implement a split-mount microwave transceiver. Such a split-mount microwave transceiver may be utilized in a wireless backhaul network (e.g., for broadband fixed wireless access or mobile phone network) and may facilitate point-to-point wireless applications of various forms of networks, including plesiochronous data hierarchy (PDH), synchronous data hierarchy (SDH), or Ethernet networks. As a radio unit, the transceiver module 800 may have part of its electronics mounted indoors in the IDU 802, and may have part of its electronics disposed outdoors in the ODU 804. For some embodiments, the ODU 804 is mounted outdoors with the antenna 808. The ODU 804 may contain a RF transmitter and a RF receiver, while the IDU 802 may contain modulator, demodulator, multiplexer, control, and traffic interface elements. The waveguide 806 may or may not be a part of the ODU 804. The IDU 802 and the ODU 804 may be coupled using a cable, such as a coaxial cable. By comparison, an all-indoor radio has all radio equipment installed inside and is connected to its antenna using a waveguide or coax feeder. As a split-mount radio unit, the transceiver module 800 may be a point-to-point radio installation for licensed 6 to 38+ GHz frequency bands with the ODU 804 direct-mounted to the rear of the antenna 808 to provide an integral antenna feed. By having the ODU 804 mounted with the antenna 808, the transceiver module 800 may eliminate or reduce feeder losses, minimize or reduce rack occupancy, or lower installed costs compared to indoor radios.

The IDU 802 may be in communication with a processor or a digital device, which may be communicatively coupled to the IDU 802 through a cable 810. The IDU 802 may comprise a modulator/demodulator and control circuitry for providing data, from a processor or a digital device over the cable 810, to the antenna 808 via the ODU 804 or the waveguide 806. The IDU 802 may be configured to receive information from the antenna 808, via the ODU 804, for providing to the processor or the digital device via the cable 810.

As described herein, the IDU 802 of the transceiver module 800 may be coupled to the ODU 804 utilizing a coaxial cable. Any number of coaxial cables may provide signals between the IDU 802 and the ODU 804. Additionally, any number or type of cables may be configured to receive and transmit signals between the IDU 802 and the ODU 804.

The transceiver module 800 may be configured to be in communication with another transceiver module through a wireless communication tower, where the other transceiver module may be similar to the transceiver module 800. The wireless communication tower (e.g., cell tower or other microwave radio device) may be any device configured to receive and/or transmit wireless information.

Figure 9:
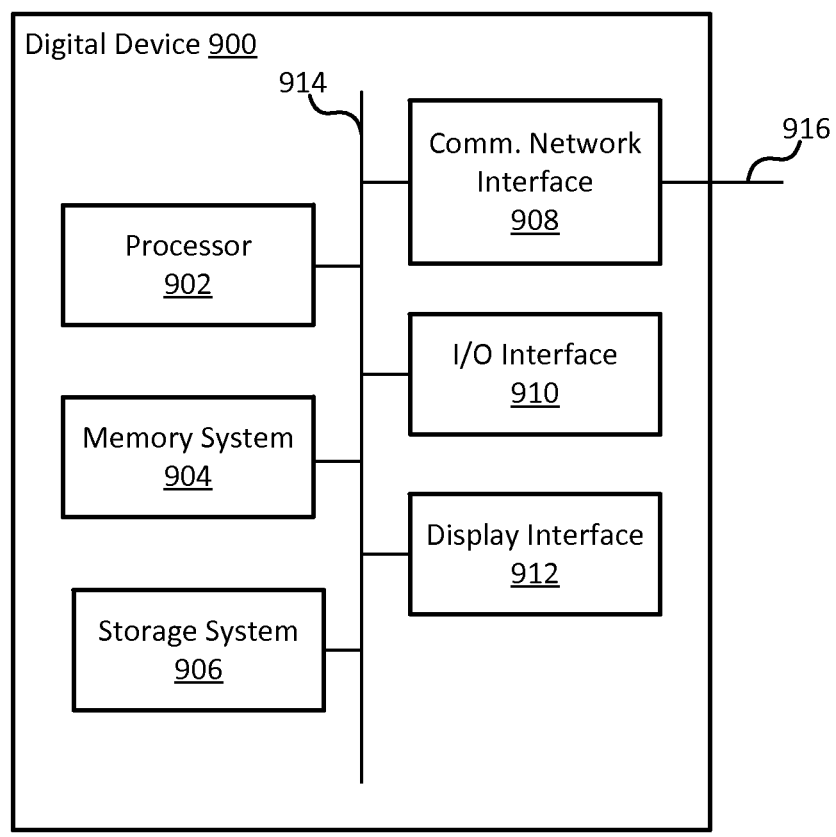
FIG. 9 depicts an example digital device according to some embodiments.

FIG. 9 depicts an example digital device 900 according to some embodiments. The digital device 900 comprises a processor 902, a memory system 904, a storage system 906, a communication network interface 908, an I/O interface 910, and a display interface 912 communicatively coupled to a bus 914. The processor 902 may be configured to execute executable instructions (e.g., programs). In some embodiments, the processor 902 comprises circuitry or any processor capable of processing the executable instructions.

The memory system 904 is any memory configured to store data. Some examples of the memory system 904 are storage devices, such as RAM or ROM. The memory system 904 may comprise the RAM cache. In various embodiments, data is stored within the memory system 904. The data within the memory system 904 may be cleared or ultimately transferred to the storage system 906.

The storage system 906 is any storage configured to retrieve and store data. Some examples of the storage system 906 are flash drives, hard drives, optical drives, and/or magnetic tape. In some embodiments, the digital device 900 includes a memory system 904 in the form of RAM and a storage system 906 in the form of flash data. Both the memory system 904 and the storage system 906 comprise computer readable media that may store instructions or programs that are executable by a computer processor including the processor 902.

The communication network interface (com. network interface) 908 may be coupled to a data network via the link 916. The communication network interface 908 may support communication over an Ethernet connection, a serial connection, a parallel connection, or an ATA connection, for example. The communication network interface 908 may also support wireless communication (e.g., 802.11 a/b/g/n, WiMAX). It will be apparent to those skilled in the art that the communication network interface 908 may support many wired and wireless standards.

The optional input/output (I/O) interface 910 is any device that receives input from the user and output data. The optional display interface 912 is any device that may be configured to output graphics and data to a display. In one example, the display interface 912 is a graphics adapter.

It will be appreciated by those skilled in the art that the hardware elements of the digital device 900 are not limited to those depicted in FIG. 9. A digital device 900 may comprise more or less hardware elements than those depicted. Further, hardware elements may share functionality and still be within various embodiments described herein. In one example, encoding and/or decoding may be performed by the processor 902 and/or a co-processor located on a GPU.

One or more functions may be stored on a storage medium such as a computer readable medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with some embodiments. Those skilled in the art are familiar with instructions, processor(s), and storage medium.

Various embodiments are described herein as examples. It will be apparent to those skilled in the art that various modifications may be made and other embodiments can be used.

We claim:

1. A system comprising:
    a clock module, of a master device, configured to provide a master clock signal having a master clock frequency;
    a counter module, of the master device, configured to increment or decrement a master device counter value, in response to the master clock signal;
    a packet generation module, of the master device, configured to monitor the master device counter value and to generate a synchronization packet at a predetermined master device interval measured by when the master device counter value reaches a predefined threshold value; and
    a communication module, of the master device, configured to transmit the synchronization packet to a slave device over a radio link coupling the system to the slave device, the synchronization packet not including a measurement based on the master device counter value, thereby allowing the slave device to synchronize a slave clock frequency to an estimated clock frequency corresponding to the master clock frequency based on a slave device interval measured by an actual slave device counter value when the synchronization packet was received relative to when a last synchronization packet was received from the master device, and on a comparison by the slave device of the actual slave device counter value against an expected slave device counter value.

2. The system of claim 1, wherein the predefined threshold value includes a predefined modulo value.

3. The system of claim 1, wherein the clock module is further configured to synchronize the master clock signal based on a primary reference clock.

4. The system of claim 3, wherein the primary reference clock includes a Synchronous Ethernet (SyncE) reference clock.

5. The system of claim 1, wherein the system is included in a split-mount microwave system.

6. A system comprising:
    a packet monitoring module, of a slave device, configured to detect receipt of a synchronization packet from a master device, the synchronization packet being received by the system over a radio link coupling the system to the master device;
    a clock module, of the slave device, configured to provide a slave clock signal having a slave clock frequency;
    a counter module, of the slave device, configured to increment or decrement a slave device counter value based on the slave clock signal;
    a clock frequency estimation module, of the slave device, configured to, in response to the packet monitoring module detecting the receipt of the synchronization packet from the master device, obtain a current counter value from the counter module of the slave device to measure a slave device interval relative to a previously received synchronization packet from the master device, to compare the current counter value to an expected counter value, and to generate an estimated clock frequency of the master device based on the comparison; and a frequency offset calculation module, of the slave device, configured to calculate a frequency offset for the slave clock frequency based on the estimated clock frequency of the master device, thereby allowing the slave device to synchronize the slave clock frequency to the estimated clock frequency of the master device.

7. The system of claim 6, wherein the clock module is further configured to update the slave clock frequency based on the frequency offset.

8. The system of claim 7, wherein the system is included in a split-mount microwave system configured to receive the synchronization packet from the master device.

9. The system of claim 7, wherein the clock frequency estimation module is further configured to determine the estimated clock frequency of the master device based further on a previously generated estimated clock frequency of the master device.

10. The system of claim 9, wherein the clock frequency estimation module is further configured to determine the estimated clock frequency of the master device using a Kalman filter.

11. A method comprising:
monitoring a counter value of a master device counter at a master device, the master device counter being driven by a master clock signal having a master clock frequency;
generating a synchronization packet at the master device at a predetermined master device interval measured by when the counter value reaches a predefined threshold value; and
transmitting the synchronization packet from the master device to a slave device over a radio link coupling the slave device to the master device when the counter value reaches the predefined threshold value, the synchronization packet not including the counter value or a measurement based on the counter value, thereby allowing the slave device to synchronize a slave clock frequency to an estimated clock frequency based on a slave device interval measured by an actual slave device counter value when the synchronization packet was received relative to when a last synchronization packet was received from the master device, and on a comparison by the slave device of the actual slave device counter value against an expected slave device counter value, the estimated clock frequency corresponding to the master clock frequency.

12. The method of claim 11, wherein the predefined threshold value includes a predefined modulo value.

13. The method of claim 11, wherein the master device includes a master clock configured to provide the master clock signal.

14. The method of claim 13, further comprising synchronizing, at the master device, the master clock signal based on a primary reference clock.

15. The method of claim 14, wherein the primary reference clock includes a Synchronous Ethernet (SyncE) reference clock.

16. The method of claim 11, wherein the transmitting the synchronization packet from the master device to the slave device comprises transmitting the synchronization packet through a split-mount microwave transmitter.

17. A method comprising:
detecting receipt of a synchronization packet from a master device at a slave device, the synchronization packet being received over a radio link coupling the slave device to the master device;
in response to the detecting the receipt of the synchronization packet at the slave device, obtaining a current counter value of a slave device counter at the slave device, the slave device counter being driven by a slave clock signal having a slave clock frequency;
generating an estimated clock frequency of the master device based on the current counter value when the synchronization packet was received relative to when the last synchronization packet was received from the master device, and on a comparison of the current counter value against an expected counter value; and
calculating a frequency offset based on the slave clock frequency and the estimated clock frequency of the master device, thereby allowing synchronization of the slave clock frequency to the estimated clock frequency of the master device.

18. The method of claim 17, further comprising updating the slave clock frequency based on the frequency offset.

19. The method of claim 17, further comprising receiving the synchronization packet through a split-mount microwave receiver coupled to the slave device.

20. The method of claim 17, wherein the slave device includes a slave clock configured to provide the slave clock signal.

21. The method of claim 17, wherein the generating the estimated clock frequency of the master device is further based on a previously generated estimated clock frequency of the master device.

22. The method of claim 21, wherein the generating the estimated clock frequency of the master device comprises using a Kalman filter.

23. A system comprising:
means for monitoring a counter value of a master device counter at a master device, the master device counter being driven by a master clock signal having a master clock frequency;
means for generating a synchronization packet at the master device at a predetermined master device interval measured by when the counter value reaches a predefined threshold value; and
means for transmitting the synchronization packet from the master device to a slave device over a radio link coupling the slave device to the master device when the counter value reaches the predefined threshold value, the synchronization packet not including the counter value or a measurement based on the counter value, thereby allowing the slave device to synchronize a slave clock frequency to an estimated clock frequency based on a slave device interval measured by an actual slave device counter value when the synchronization packet was received relative to when a last synchronization packet was received from the master device, and on a comparison by the slave device of the actual slave device counter value against an expected slave device counter value, the estimated clock frequency corresponding to the master clock frequency.

24. A system comprising:
means for detecting receipt of a synchronization packet from a master device at a slave device, the synchronization packet being received by the system over a radio link coupling the slave device to the master device;

means for obtaining a current counter value of a slave device counter at the slave device in response to the detecting the receipt of the synchronization packet at the slave device, the slave device counter being driven by a slave clock signal having a slave clock frequency;

means for generating an estimated clock frequency of the master device based on the current counter value when the synchronization packet was received relative to when the last synchronization packet was received from the master device, and on a comparison of the current counter value against an expected counter value; and means for calculating a frequency offset based on the slave clock frequency and the estimated clock frequency of the master device, thereby allowing the system to synchronize the slave clock frequency to the estimated clock frequency of the master device.

* * * * *